United States Patent
Bang et al.

(10) Patent No.: US 7,965,999 B2
(45) Date of Patent: Jun. 21, 2011

(54) APPARATUS AND METHOD FOR MANAGING INTEGRATED AUTHENTICATION FOR PERSONAL MOBILITY IN WIRED/WIRELESS INTEGRATED SERVICE NETWORK

(75) Inventors: Jung-Hee Bang, Seoul (KR); Han-Wook Jung, Seoul (KR); Do-Jin Park, Seoul (KR); Jong-Hyun Lee, Seoul (KR)

(73) Assignee: KT Corporation, Seongnam (KR)

( * ) Notice: Subject to any disclaimer, the term of this patent is extended or adjusted under 35 U.S.C. 154(b) by 660 days.

(21) Appl. No.: 11/694,740

(22) Filed: Mar. 30, 2007

(65) Prior Publication Data

US 2007/0224970 A1    Sep. 27, 2007

Related U.S. Application Data

(63) Continuation of application No. PCT/KR2005/003236, filed on Sep. 30, 2005.

(30) Foreign Application Priority Data

Sep. 30, 2004    (KR) ........................ 10-2004-0078020

(51) Int. Cl.
    *H04M 1/66*    (2006.01)
(52) U.S. Cl. ....................................................... 455/411
(58) Field of Classification Search ................... 455/411
    See application file for complete search history.

(56) References Cited

U.S. PATENT DOCUMENTS

| 6,157,953 | A | 12/2000 | Chang et al. | |
| 7,328,268 | B1 * | 2/2008 | Foltak et al. | 709/228 |
| 2003/0159072 | A1 * | 8/2003 | Bellinger et al. | 713/202 |
| 2003/0236874 | A1 * | 12/2003 | Hotti | 709/224 |
| 2004/0168052 | A1 * | 8/2004 | Clisham et al. | 713/153 |
| 2007/0124490 | A1 * | 5/2007 | Kalavade et al. | 709/230 |

FOREIGN PATENT DOCUMENTS

CN    1397125 A    2/2003

(Continued)

OTHER PUBLICATIONS

International Preliminary Report on Patentability dated Oct. 30, 2006 from PCT Application No. PCT/KR2005/003235, which is the parent application, in 4 pages.

Notice of Allowance issued on Feb. 25, 2008 in corresponding Korean patent application No. 10-2004-0078020 in 2 pages.

(Continued)

*Primary Examiner* — Marivelisse Santiago-Cordero
*Assistant Examiner* — Omoniyi A Obayanju
(74) *Attorney, Agent, or Firm* — Knobbe Martens Olson & Bear LLP

(57) ABSTRACT

Provided are an integrated authentication processing apparatus for personal mobility in a wired/wireless integrated service network, a method thereof, and a computer-readable recording medium for recording a program that implements the method. The integrated authentication processing method includes the steps of: a) receiving a network service subscription request from a user through the Internet, registering the user as a service subscriber, and storing/managing subscription information of the subscriber; b) receiving the network access request from a user terminal through a network control platform, processing an integrated authentication for network access and additional services, and transmitting the result to the user terminal through the network control platform; and c) processing a charge information process request from the user terminal whose access is allowed according to the authentication result of the step b) by using charge information and session information of the subscriber without additional authentication process.

5 Claims, 6 Drawing Sheets

FOREIGN PATENT DOCUMENTS

| | | |
|---|---|---|
| CN | 101057455 B | 10/2010 |
| KR | 10-2001-0063097 A | 7/2001 |
| KR | 10-2002-0078898 A | 10/2002 |
| KR | 10-2003-0089363 A | 11/2003 |
| WO | 03/092190 A1 | 11/2003 |

OTHER PUBLICATIONS

PCT International Search Report dated on Dec. 28, 2005, regarding Application No. PCT/KR2005/003235.

* cited by examiner

APPARATUS AND METHOD FOR MANAGING INTEGRATED AUTHENTICATION FOR PERSONAL MOBILITY IN WIRED/WIRELESS INTEGRATED SERVICE NETWORK

CROSS-REFERENCE TO RELATED PATENT APPLICATIONS

This application is a continuation application under 35 U.S.C. §365(c) of International Application No. PCT/KR2005/003236, filed Sep. 30, 2005 designating the United States. International Application No. PCT/KR2005/003236 was published in English as WO2006/080668 A1 on Aug. 3, 2006. This application further claims the benefit of the earlier filing dates under 35 U.S.C. §365(b) of Korean Patent Application No. 10-2004-0078020 filed Sep. 30, 2004. This application incorporates herein by reference the International Application No. PCT/KR2005/003236 including the International Publication No. WO2006/080668 A1 and the Korean Patent Application No. 10-2004-0078020 in their entirety.

BACKGROUND

1. Field

The present invention relates to an authentication processing apparatus in a wired/wireless integrated service network and a method thereof, and, more particularly, to an integrated authentication processing apparatus for personal mobility that processes authentication and provides service in a diverse wired/wireless integrated service network regardless of where an individual user is.

2. Discussion of the Related Technology

Generally, it has been quite troublesome to sign up for access and additional/application services because subscription applying method and procedures are not unified and systemized for the services. In addition, since authentication cannot be performed for each user, it is hard to provide an additional service in general access and additional/application service subscription methods.

Since a service subscription process and authentication is carried out separately for each of additional services except the access service, the general subscription method caused trouble to users and since the subscription process is not performed in real-time, there is a problem that a desired service cannot be provided instantly.

The discussion in this section is to provide general background information, and does not constitute an admission of prior art.

SUMMARY

It is, therefore, an aspect of the present invention to provide an integrated authentication processing apparatus for processing integrated authentication for a network access service and additional services through diverse wired/wireless integrated service networks regardless of the location of an individual user for personal mobility, a method thereof, and a computer-readable recording medium for saving a program that implements the method.

Also, it is another aspect of the present invention to provide an integrated authentication processing apparatus for personal mobility that can manage an authentication service, a network-based additional service and sessions in real-time; provide an instant and efficient subscription management through self-provisioning for each subscriber; and provide a stable service and a network management service with diverse statistical functions, a method thereof, and a computer-readable recording medium for saving a program that implements the method.

Other aspects and advantages of the present invention will be clearly understood by the following description and embodiments. Also, it is obvious to those skilled in the art that the aspects and advantages of the present invention can be realized by the means as claimed and combinations thereof.

In accordance with one aspect of the present invention, there is provided an apparatus for processing authentication in a wired/wireless integrated service network, which includes: an information controller for analyzing information received from a user terminal through a network control platform, transmitting authentication process request information to an authentication processor and charge process request information to a charge processor, receiving processing results from the authentication processor and the charge processor, and transmitting the processing results to the user terminal through the network control platform; an authentication processor for, when authentication information is received from the information controller, acquiring session information and authentication information from a database (DB) processor, performing authentication process, generating network control information by extracting additional service control information for each subscriber from the DB processor, and transmitting the generated network control information and the authentication result to the information controller; a charge processor for, when the charge process request information is received from the information controller, acquiring charge information and session information for the subscriber from the DB processor and performing charge processing; the DB processor for managing authentication information, charge information, subscriber information, session information and operation management information in a form of a database; and an interaction processor for receiving an access/service subscription request or a charge inquiry request from the subscriber through the Internet through a world wide network, such as a web, performing subscription/charge processing, transmitting access/charge processing results to the subscriber through the Internet.

The apparatus further includes: a statistic processor for, when a service statistic information request is received from an operator, generating and providing service statistic information by using the subscription information, the authentication information, the session authentication or the operation management information which are stored in the DB processor.

In accordance with another aspect of the present invention, there is provided a method for processing authentication in a wired/wireless integrated service network, the method which includes the steps of: a) receiving a network service subscription request from a user through the Internet, registering the user as a service subscriber, and storing/managing subscription information of the subscriber; b) receiving the network access request from a user terminal through a network control platform, processing a network access authentication and a service authentication integratedly for the subscriber to thereby produce an authentication result, and transmitting the authentication result to the user terminal through the network control platform; and c) processing a charge information process request from the user terminal whose access is allowed according to the authentication result of the step b) by using charge information and session information of the subscriber without additional authentication process.

The method further includes the steps of: d) receiving a charge information request from the subscriber through the Internet, generating charge information that conforms to the subscriber's charge information request based on charge information stored in a database and providing the generated charge information to the subscriber in real-time; and e) receiving a service statistic information from an operator through the Internet, performing service statistic process based on subscription information, authentication information, charge information, session information, and operation management information which are stored in the database to thereby produce a service statistic processing result, and transmitting the service statistic processing result to the operator.

In accordance with another aspect of the present invention, there is provided a computer-readable recording medium for recording a program that implements a method for processing integrated authentication for personal mobility in a wired/wireless integrated service network in an integrated authentication processing apparatus with a processor, the method which includes the steps of: a) receiving a network service subscription request from a user through the Internet, registering the user as a service subscriber, and storing/managing subscription information of the subscriber; b) receiving the network access request from a user terminal through a network control platform, processing a network access authentication and a service authentication integratedly for the subscriber to thereby produce an authentication result, and transmitting the authentication result to the user terminal through the network control platform; and c) processing a charge information process request from the user terminal whose access is allowed according to the authentication result of the step b) by using charge information and session information of the subscriber without additional authentication process.

The computer-readable recording medium further includes the steps of: d) receiving a charge information request from the subscriber through the Internet, generating charge information that conforms to the subscriber's charge information request based on charge information stored in a database and providing the generated charge information to the subscriber in real-time; and e) receiving a service statistic information from an operator through the Internet, performing service statistic process based on subscription information, authentication information, charge information, session information, and operation management information which are stored in the database to thereby produce a service statistic processing result, and transmitting the service statistic processing result to the operator.

An embodiment of the present invention provides a Single Sign-On (SSO) function that can provide a real-time service subscription management function and service mobility based on network control by performing integrated authentication and service management for each subscriber through diverse access networks, regardless of the location of the subscriber.

An embodiment of the present invention provides a basic technology that can provide a user with not only an access service but also additional network services simultaneously by unifying functions related to subscription processing through the Internet through a world wide network, such as a web, improving a service processing method, and adding network-based additional service information and controlling authentication result during the authentication process. Also, since an embodiment of the present invention unifies authentication for the access service and the additional/application service in the stage of network access authentication, it allows a user to use the additional/application services without going through additional access and authentication processes.

Also, since an embodiment of the present invention provides a self-provisioning function, in which an individual user can perform service provisioning for himself, to provide an instant service for each subscriber, it is possible to manage diverse service subscription and provide services, such as systematic individual ID management, instant subscription process and service process, and individual subscription and management of an additional service, and control the user services in interaction with a network control platform by processing an authentication service and connecting the authentication result with service control information.

In particular, since an embodiment of the present invention provides the SSO function without additional access and authentication process when diverse additional/application services are provided based on real-time session information, the integrated authentication processing apparatus and method for personal mobility, which is suggested in an embodiment of the present invention, can provide subscribers with convenience and diverse charging functions, real-time session management in connection with a session information system, and stable performance and customer management service based on internal-statistics and operation management functions.

Also, the integrated authentication processing apparatus and method of an embodiment of the present invention can provide a unified wired/wireless integration service of an Internet Protocol (IP) access system for personal mobility, provide access authentication and additional/application service authentication in a network to thereby improve user convenience, and manage service information of a subscriber in a personalized and systemized method by providing a systemized IP access authentication function and subscriber/charge management function in diverse access networks at home or specified hot spots.

An embodiment of the present invention provides a basis for providing transparent data service through centralized management of subscriber's mobility to maintain, repair and manage the entire network consistently. It provides subscribers with ceaseless services, a network provider with an extendable and highly usable service, and an operator with services of high usability through centralized management.

Embodiments of the present invention described above provide an integrated authentication processing apparatus for efficiently processing services specialized for an individual user, i.e., for each user identification (ID), based on network mobility through diverse access network regardless of the location of the user. An embodiment of the present invention can secure a basis for providing ceaseless wired/wireless authentication and additional services by providing the subscribers with real-time service subscription and a personalized service provisioning function, e.g., application, termination, inquiry, and modification of real-time service subscription, providing them with a basis for unifying network access authentication and additional/application service access authentication through real-time session management, and providing them with diverse service control functions in connection with network controlling functions.

When Internet services are requested to be processed through a variety of heterogeneous access networks, an embodiment of the present invention allows each subscriber to perform integrated service management by providing service characteristics of each subscriber in a systemized method for an authentication service with respect to all wired/wireless services provided by network providers.

Also, an embodiment of the present invention provides a real-time service processing function to provide service subscription applying service and diverse service provisioning in real-time. Further it makes subscribers use all Internet services provided by the network providers through one-time authentication without additional authentication procedures by unifying the authentication for all the access service and additional/application services.

Also, since an embodiment of the present invention induces subscribers to receive authentication-based services for all IDs of the network provider, it can provide advantages to the network provider over other business providers in the respect of raising the number of subscribers and provide the network provider with economical profits and the subscribers with convenience at the same time.

In addition, an embodiment of the present invention provides reliable and stable services to the subscribers by providing a stable service/network management service through diverse statistic functions, provides extendable services to new subscribers rapidly by offering a basis for a roaming service in connection with existing network service providers, such as mobile communication businesses and wireless local area network (LAN) businesses, and makes the network service provider to take an advantage over other businesses in an emerging wireless Internet service market with services differentiated from other competing businesses.

Also, an embodiment of the present invention provides convenient and systemized authentication service customized for each of the subscribers who requires wired/wireless Internet services in real-time by performing centralized and integrated authentication, provides stable and reliable integrated authentication service that can secure an access service and transmit additional/application service messages without reconstructing an additional network while securing services and personal mobility at home or specialized hot spots, and increases the network efficiency by providing services and basis which are necessary not only to individual subscribers but also to the service provider to secure diverse subscribers and reduce a network/system load.

Also, an embodiment of the present invention can provide a real-time consumption volume inquiry function and diverse charging functions including integrated charging based on ID, which is provided in diverse methods, to thereby provide convenient subscription application/access services and reflect the characteristics of an Internet Protocol (IP) network.

Also, an embodiment of the present invention provides the subscribers with convenient access/service consumption/service management function by providing services regardless of the location of the subscribers and the kinds of an access network, provides the service provider with a function combining network control with authentication, which has not been provided in typical technologies, a function combining access authentication with additional/application service authentication, a real-time ID applying system for each user to thereby provide a cash cow for ultra high-speed access service revenue source.

Also, an embodiment of the present invention provides a service specialized for each subscriber by using a user-based service statistic function, which is a customer relations management (CRM), provides a wired/wireless service that conforms to user preference by designing functional elements in the form of an expendable module so that the service can be used transparently, and provide service differentiated from other service providers.

Moreover, an embodiment of the present invention provides diverse authentication method to reflect the characteristics of an IP network and satisfy the increasing needs of Internet users maximally, and a function for encrypting data in the wireless area when the Internet service is provided in the wireless area to protect user information.

DESCRIPTION OF THE DRAWINGS

The above and other aspects and features of the present invention will become apparent from the following description of the embodiments given in conjunction with the accompanying drawings, in which.

DETAILED DESCRIPTION OF EMBODIMENTS

Other features and aspects of the invention will become apparent from the following description of the embodiments with reference to the accompanying drawings, which is set forth hereinafter.

Figure 1:
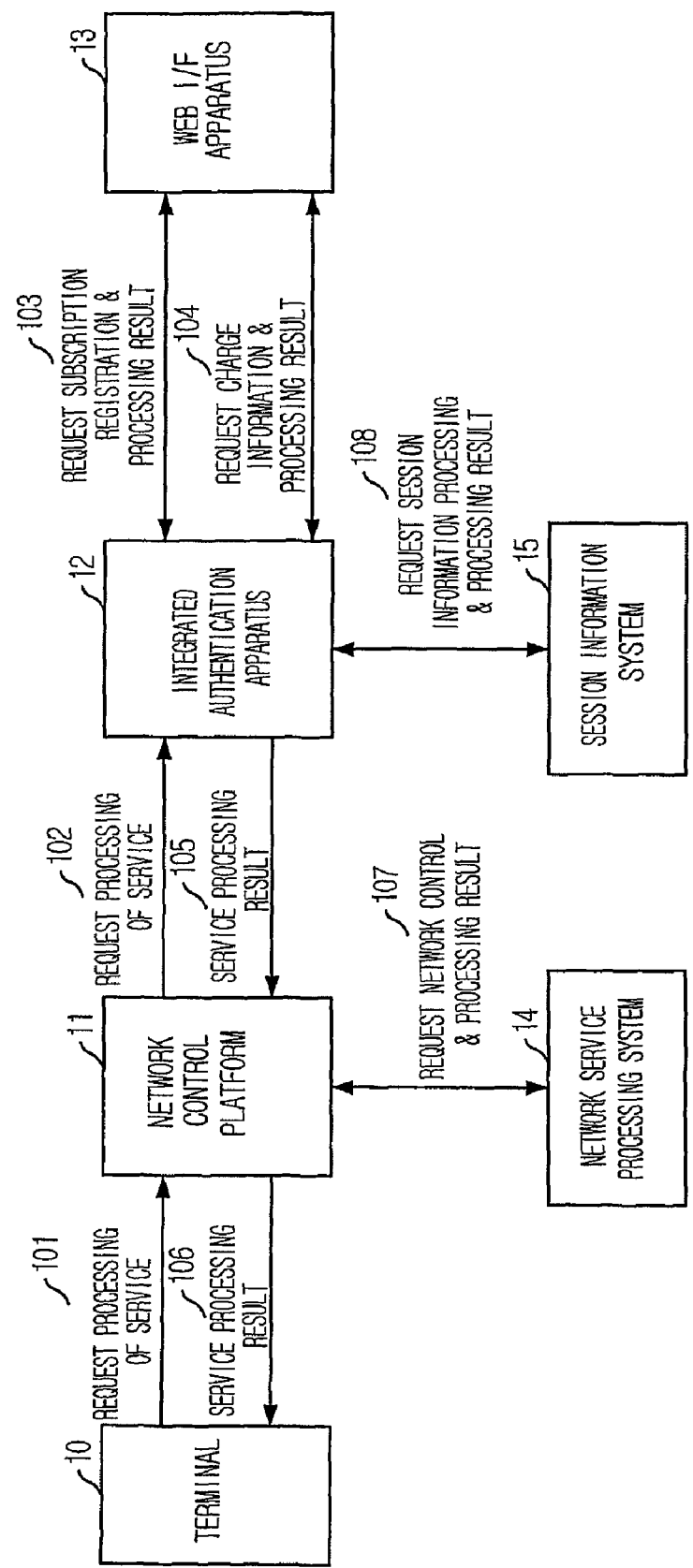
FIG. 1 is a block diagram showing a wired/wireless integrated service network to which an embodiment of the present invention is applied.

FIG. 1 is a block diagram showing a wired/wireless integrated service network to which an embodiment of the present invention is applied. Wired/wireless services provided by diverse user terminals through diverse access networks can require authentication and related service processes by using diverse authentication clients. The authentication and related service processes is largely divided into wired services and wireless services but the service processing procedures follow four major steps regardless of wired/wireless services. The first one is a procedure for service subscription application, and the second one is a procedure for processing and controlling an authentication service. The third one is a procedure for charging for the consumed service, and the fourth one is a procedure for performing statistics on the consumed service.

An embodiment of the present invention is directed to technology for the first to third procedures, which are core functions for providing a service based on personal mobility. Hereinafter, the technology for the three procedures will be described.

When a user signs up for a service, the technology of an embodiment of the present invention provides a self-provisioning function for performing service provisioning for himself to provide a service instantly to each subscriber so that the subscriber can manage diverse service subscription and service processing, such as ID system management for each subscriber, instant order processing, and subscription application for additional services.

Also, an embodiment of the present invention provides a network-based additional service instantly by performing an authentication service, combining an authentication result with service control information and performing a user service control in connection with a network control platform. In particular, when diverse additional/application services are provided, an embodiment of the present invention provides a Single Sign-On (SSO) function for providing a service instantly without additional access and authentication procedure based on session information stored during charge service process.

Authentication requests in diverse access networks are largely divided into those in wireless networks and those in wired networks. In the wireless network, an authentication request is made for Internet services based on Extensible Authentication Protocol (EAP) by using a terminal equipped with a wireless LAN card such as a laptop computer or a Personal Digital Assistant (PDA). In the wired networks, authentication is requested by using a desktop computer. Herein, a network control platform 11 which is a network access apparatus, receives a service processing request at step S101 and transmits the service processing request to an integrated authentication processing apparatus 12 at step S102.

The integrated authentication processing apparatus 12 performs a series of service procedures upon receipt of the service processing request transmitted form the network control platform 11 and transmits a service processing result to the network control platform 11 at step S105. Herein, since a network controlling function may need to be performed to provide an additional service during the service processing, the integrated authentication processing apparatus 12 provides the network controlling function in connection with a network service processing system 14 for each additional service and transmits an authentication service processing result to a user terminal 10 based on the network control result at steps S106 and S107.

After the authentication is carried out successfully, a series of charging procedures are performed and session information is generated. To perform operations related to the session information in real-time, the integrated authentication processing apparatus 12 provides diverse additional/application services without additional access and authentication procedures but with the network access and authentication through real-time session management in connection with a session information system 15.

To perform the aforementioned function, a service subscription applying procedure is processed for each user as follows. When a service subscription request and various service profile management requests are transmitted to the integrated authentication processing apparatus 12 through a web interface 13, the integrated authentication processing apparatus 12 performs related functions in real-time and transmits a performance result to the web interface 13 at step S103. Also, when the integrated authentication processing apparatus 12 receives a charge information process request from the Internet at step S104 to process various charge functions including charge history and service consumption inquiry through the Internet, it transmits a process result to the web interface 13 at step S104.

Figure 2:
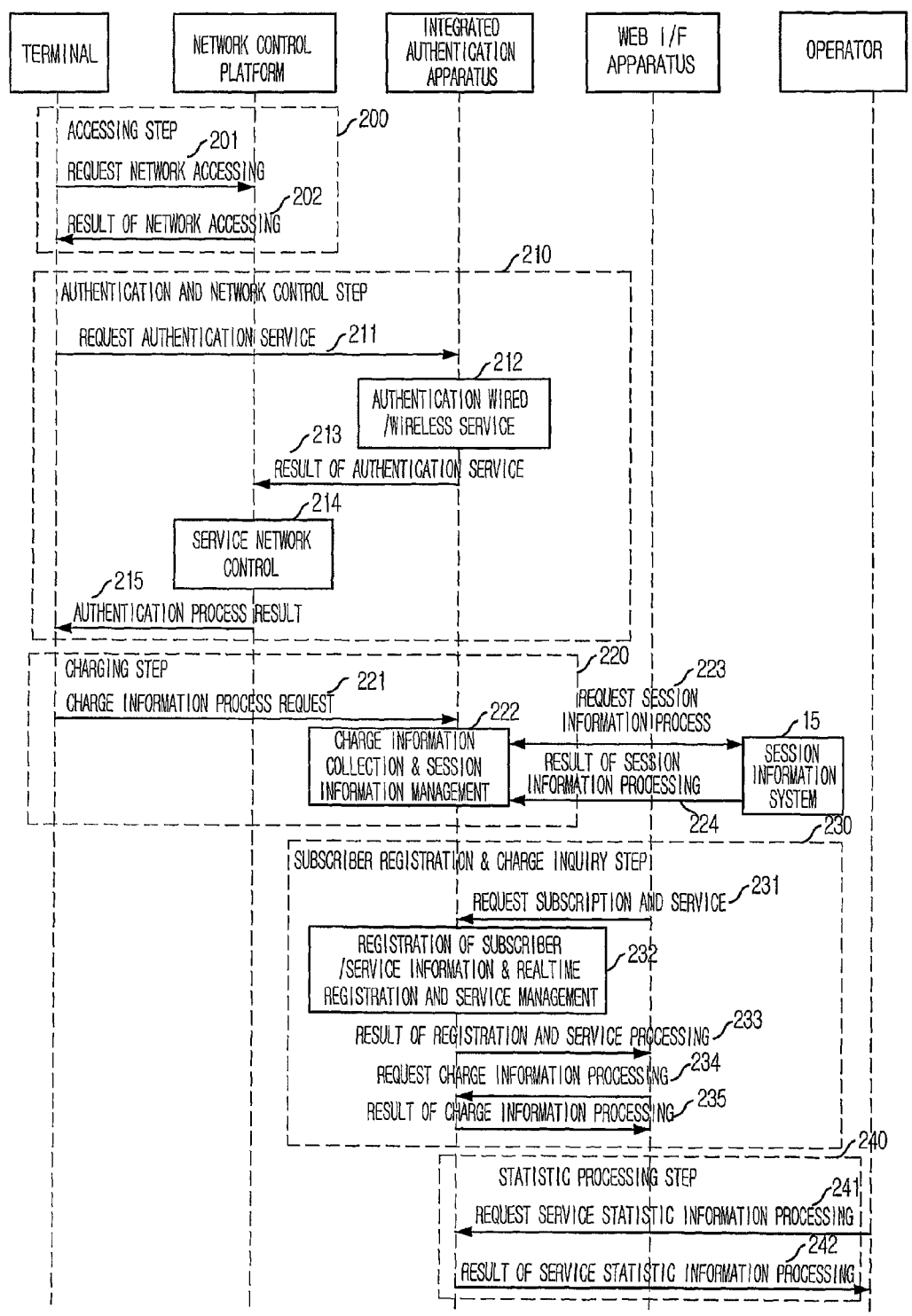
FIG. 2 is a flowchart describing an integrated authentication process for personal mobility in a wired/wireless integrated service network in accordance with an embodiment of the present invention.

FIG. 2 is a flowchart describing an integrated authentication process for personal mobility in a wired/wireless integrated service network in accordance with an embodiment of the present invention. The drawing shows integrated management procedures on authentication/charging/session/subscriber management functions which are carried out in the integrated authentication processing apparatus 12.

The core function is an integrated function, i.e., a Single Sing-On (SSO) function, for providing personal mobility and network/service control, processing subscriber authentication through real-time session management, managing subscriber information in real-time.

As illustrated in FIG. 2, the function is provided to a user largely through five procedures, a network access procedure of step S200, an authentication and access control procedure of S210, a charging procedure of S220, a subscriber registration and charge inquiry procedure of S230, and a statistic processing procedure of S240.

The network access procedure of step S200 is a physical access procedure. Diverse user terminals 10 transmit a network access request to a network control platform 11 according to network characteristics. Process result is transmitted to the user terminals 10 at step S202 and network access is allowed according to the process result. Herein, the user terminals 10 include wired terminals and wireless terminals.

Subsequently, network access authentication and service control procedure is performed at step S210 to allow the network access. This is an access authentication procedure based on user service. Authentication service processing requests from diverse user terminals 10 are transmitted to the integrated authentication processing apparatus 12 at step S211 through a network control platform 11 performing an authentication client function.

The integrated authentication processing apparatus 12 performs an authentication function including wired/wireless network access authentication and additional service authentication at step S212 through a series of procedures, and an authentication result and a service processing result are transmitted to the network control platform 11 at step S213.

The network control platform 11 which has received the authentication service processing result analyzes the received information and performs a network controlling function to provide a network-based additional service at step S214 and it transmits the received authentication service processing result to the user terminals 10 which have requested authentication at step S215.

In the meantime, when the network authentication is obtained successfully, the user can use the Internet. Herein, a charge information processing request is transmitted from the user to the integrated authentication processing apparatus 12 to collect actual service consumption volume at step S221. The integrated authentication processing apparatus 12 provides a function of collecting and managing charge and session information to provide a real-time session processing function and diverse charging functions at step S222 with respect to the received charge information processing request. Particularly, the SSO function is provided so that diverse additional/application service can be provided without additional authentication but with only the network access authentication of the user by interacting the managed session information with the session information system 15 in real-time.

To perform the above procedures, functions related to service subscription is pre-processed and information related to service subscription is stored in a DBMS of the integrated authentication processing apparatus 12. The pre-process procedure is a subscriber registration procedure of step S230. In the subscriber registration procedure of step S230, a self-provisioning function where a user can manage his access and functions related to additional/application service subscription for himself through the Internet is provided at step S231. Then, the integrated authentication processing apparatus 12 receives and self-provisioning information, performs subscription process and functions related to subscriber registration, such as registration of subscriber and service information and real-time management of subscription and service, in real-time at step S232, and transmits a processing result thereof to the user through the web interface 13.

Also, when the user requests the integrated authentication processing apparatus 12 to perform diverse charge function in detail, such as real-time service consumption inquiry, individual charge and family integrated charge, at step S234, the integrated authentication processing apparatus 12 processes the charge information requested by the user based on the stored charge information and provides a processing result to the user at step S235.

A basic service is provided through the above four procedures and a differentiated service management function for each subscriber is provided through statistic procedure of the step S240.

To provide diverse statistic functions, when the integrated authentication processing apparatus 12 receives a service statistics information from an operator at step S241, it performs a service statistic process based on collected information stored for each subscriber, e.g., authentication, charge, session and operation related basic information and transmits a processing result to the operator at step S242.

Figure 3:
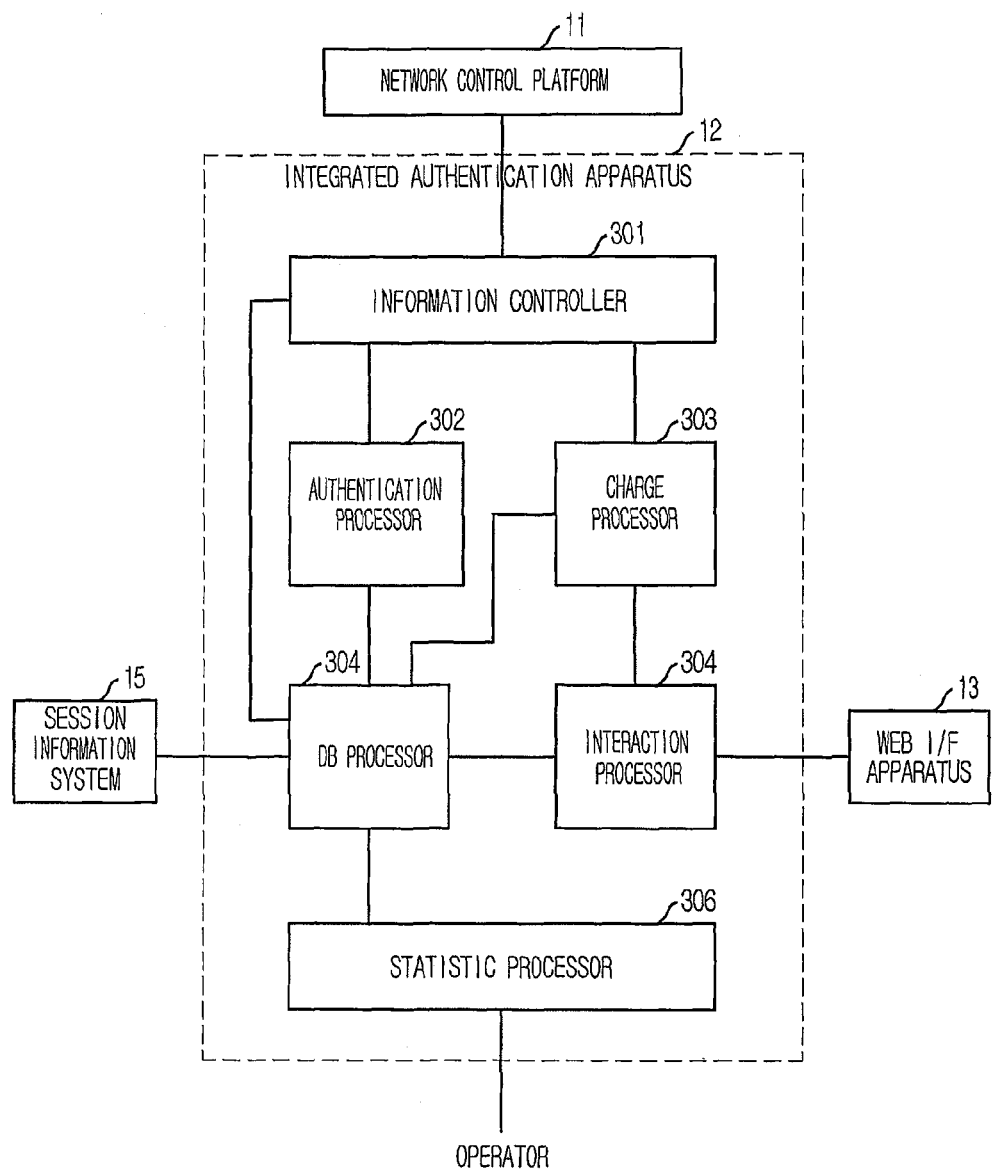
FIG. 3 is a block diagram illustrating an integrated authentication processing apparatus for personal mobility in a wired/wireless integrated service network in accordance with an embodiment of the present invention.

FIG. 3 is a block diagram illustrating the integrated authentication processing apparatus for personal mobility in a wired/wireless integrated service network in accordance with an embodiment of the present invention.

The network control platform 11 uses AP (AP), NAS (NAS), and Subscriber Edge Router (SER) according to the characteristics of an access network to perform network control on diverse networks and it functions as an authentication client. Herein, the network control platform 11 performs port separation to separately transmit the authentication and charge information, separately process authentication and charge messages, cooperates with an information controller 301 of the integrated authentication processing apparatus 12 to process the authentication and charge data, receives result values of the authentication and charge process, and controls the network based on the received result values.

In short, an embodiment of the present invention provides personal mobility based on the network by providing each subscriber with a constant service control function regardless of the location and access network of the subscriber.

The information controller 301 receives authentication process request information or charge process request information from the network control platform 11 and analyzes whether the received information is authentication process request information or charge process request information, and transits the received information to an authentication processor 302 or an accounting processor 303. Then, it receives the processing result from the authentication processor 302 or an accounting processor 303 and transmits the result to the network control platform 11. In particular, when authentication is processed for a wireless service, the information controller 301 checks whether the number of simultaneous sessions of a user who requested authentication currently exceeds the allowable number of simultaneous sessions in a database (DB) processor 304. If it exceeds the allowable number of simultaneous sessions, the information controller 301 rejects authentication and transmits an authentication failure message to the network control platform 11. If the number of simultaneous sessions of the user who requested authentication currently is smaller than the allowable number of simultaneous sessions, the information controller 301 transmits an authentication success message to the authentication processor 302.

When the authentication processor 302 receives authentication request information from the information controller 301 such as user identification/password (ID/PWD)-based information and Media Access Control (MAC) ID-based information, it first inquires session information and extracts authentication information to and from the DB processor 304. Then, it generates network control information by extracting additional service control information for each subscriber from the DB processor 304 and transmits the generated network control information to the information controller together with an authentication result.

When the charge controller 303 receives charge process request information, i.e., user network access charge process request information, from the information controller 301, it calculates charge by acquiring charge information and session information of the user from the DB controller 304.

In other words, when the charge processor 303 receives charge process request information form the information controller 301, it processes session and collects service consumption volume information in real-time from the DB processor 304 to inquire service consumption volume and manage session in real-time. Also, when the network control platform 11, which is a network access device, suffers an error, the charge processor 303 receives the error information and performs session control so that there is no problem in providing the authentication service. Also, it performs session process when the user terminates its access, the real-time access-based session processing provides the most important performance during the authentication and charge procedures. The SSO function can be provided based on the session information stored in the real-time access-based session processing.

The DB processor 304 classifies the received subscription information including authentication information and service information and forms a database for authentication information/charge information/subscriber information which are needed for authentication and charging service in cooperation with an interaction processor 305. Also, the DB processor 304 forms a session information database for providing real-time service consumption volume information and volume rate service, which require a subscriber to pay as much as he uses the service, provides the authentication service based on the authentication information, charge information and session information which are stored in the process of authentication service, and provides the SSO function based on the real-time session access information in connection with the session information system 15. Besides, the DB processor 304 provides master information which is referred to when the access is terminated, when the network suffer an error and when abnormal error occurs.

That is, a DBMS (DBMS) 702 of the DB processor 304 is formed of a subscriber information database for subscription, authentication information database for authentication, charge information database for charge, session information database for session, and operation management database for service operation.

The interaction processor 305 provides diverse functions needed for the subscriber to perform self-provisioning on the service in the web interface 13. Particularly, it provides functions related to basic subscription information for each subscriber, such as ID subscription/termination/modification/inquiry for each subscriber and integrated charge function for family, friends by setting up ID hierarchy. In connection with additional services, the interaction processor 305 receives diverse additional service information and control information and processes the information. Also, the interaction processor 305 performs charge-related requests, such as real-time service consumption volume inquiry and integrated charge for each ID.

When the statistic processor 306 receives service statistic information request from the operator, it provides diverse service statistic information in connection with the subscriber information database, the authentication information database, the session information database, and the operation management database, which are stored in the DB processor 304. Also, the statistic processor 306 provides a basic data for differentiated service based on Customer Relationship Management (CRM) for each customer ID.

Figure 4:
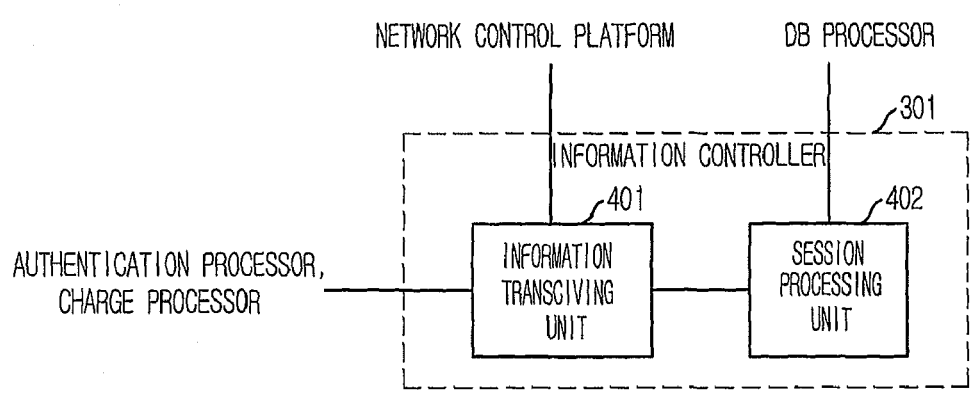
FIG. 4 is a block diagram showing an information controller of FIG. 3 in accordance with the embodiment of the present invention.

FIG. 4 is a block diagram showing the information controller of FIG. 3 in accordance with the embodiment of the present invention. The information controller 301 includes an information transceiving unit 401 and session processing unit 402.

The information transceiving unit 401 transmits and receives authentication process request information and charge process request information based on authentication protocol. It receives the authentication process request information and the charge process request information from the network control platform 11, e.g., AP, NAS and SER, transmits the authentication process request to the authentication processor 302 and the charge process request information to the charge processor 303, receives processing results from them 302 and 303, and transmits the results to the network control platform 11. Herein, in case of a wireless authentication process request information, the information transceiving unit 401 transmits the authentication process request information to the session processing unit 402 before transmitting it to the authentication processor 302 and receives a processing result thereof.

Meanwhile, the session processing unit 402 receives the authentication process request information from the information transceiving unit 401 when the authentication request is made through a wireless access network, checks the number of simultaneous sessions of the user who requests for authentication currently is larger than the allowable number of simultaneous sessions in connection with the DB processor 304 in order to maintain the same session. If it exceeds the allowable number of simultaneous sessions, the session processing unit 402 transmits an authentication rejection value to the information transceiving unit 401. If it is smaller than the allowable simultaneous session number, the session processing unit 402 transmits an authentication allowance value to the information transceiving unit 401.

Figure 5:
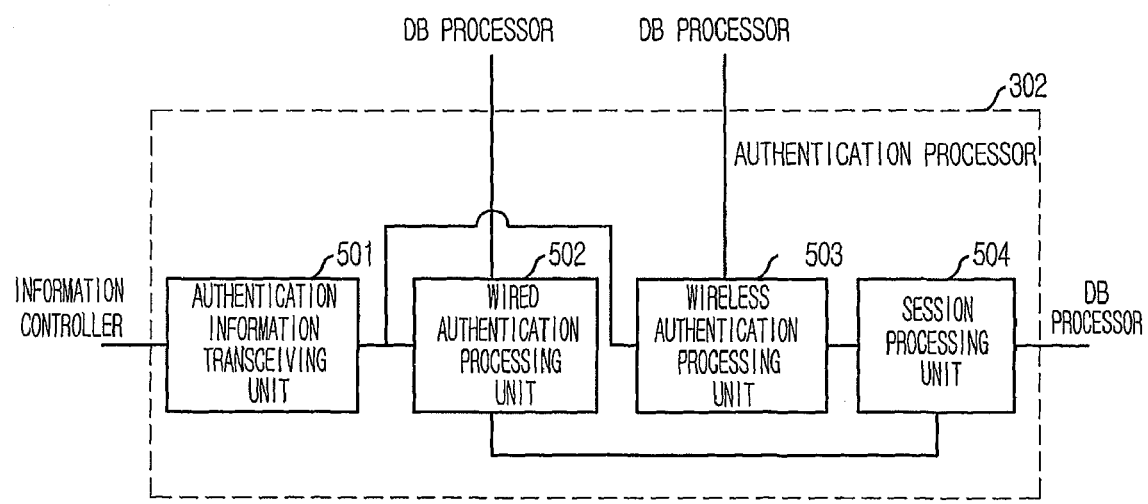
FIG. 5 is a block diagram showing an authentication processor of FIG. 3 in accordance with the embodiment of the present invention.

FIG. 5 is a block diagram showing an authentication processor of FIG. 3 in accordance with the embodiment of the present invention. As illustrated in the drawing, the authentication processor 302 includes an authentication information transceiving unit 501, a wired authentication processing unit 502, a wireless authentication processing unit 503, and a session processing unit 504.

The authentication information transceiving unit 501 receives authentication process request information from the information controller 301 and identifies whether the authentication process request information is for a wired authentication or a wireless authentication. If it is for the wired authentication, the authentication information transceiving unit 501 transmits the wired authentication process request to the wired authentication processing unit 502 or if it is for the wireless authentication, the authentication information transceiving unit 501 transmits the wireless authentication process request to the wireless authentication processing unit 503. Subsequently, the authentication information transceiving unit 501 receives and transmits an authentication result and additional service control information to the information controller 301.

The wired authentication processing unit 502 processes the wired authentication service process request. It finds out whether authentication can be allowed or not by checking subscriber information and controlling session in connection with the DB processor 304, and checking a mobility value to know whether a wired subscriber can receive a service in a hot spot area, e.g., Nespot area. Then, the wired authentication processing unit 502 additionally extracts network additional service control information from the DB processor 304 and transmits it to the authentication information transceiving unit 501 together with an authentication result.

The wireless authentication processing unit 503 processes the received wireless authentication service process request and performs authentication only within the allowable session number. In particular, the wireless authentication processing unit 503 performs detailed authentication function on authentication information received for encryption in the wireless area in order to provide 802.1x-EAP-MD5 (Message Digest 5) and 802.1x-EAP-TTLS (Tunneled Transport Layer Security). Herein, the 802.1X is a port access protocol for protecting a network.

It is checked whether there is a session out information in the authentication information by adding EAP related information to the authentication information to perform EAP-MD5 and EAP-TTLS authentication. When the authentication information includes the session out information, the authentication is performed. Also, when MAC ID authentication information is requested, the user's name is checked before authentication because there is no realm information. If an MAC ID is turned out from the user name, the authentication is performed by adding @mac_realm to the tail of the user's name and adding mac_realm to the authentication information as a PW_USER_REALM attribute value.

The session processing unit 504 manages basic information needed for authentication and session. It secures multiple log-in and provides sub-functions for preventing multiple log-in when authentication information is processed in connection with the wired authentication processing unit 502 and wireless authentication processing unit 503 so that authentication can be performed within the allowed session number by processing session differently according to wire/wireless authentication service.

Figure 6:
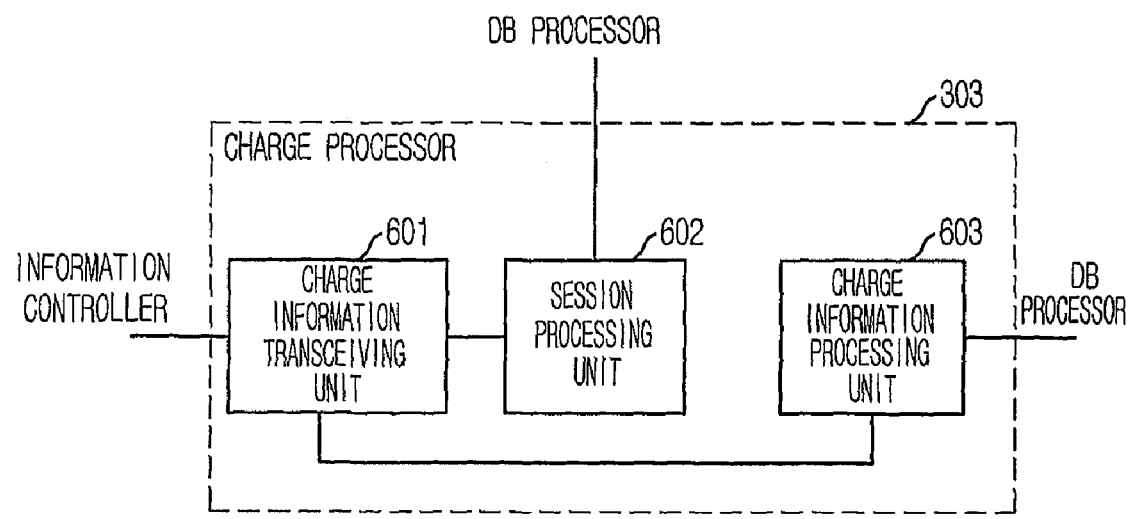
FIG. 6 is a block diagram showing an accounting processor of FIG. 3 in accordance with the embodiment of the present invention.

FIG. 6 is a block diagram showing the charge processor of FIG. 3 in accordance with the embodiment of the present invention. The charge processor 303 includes a charge information transceiving unit 601, a session processing unit 602 and charge information processing unit 603.

The charge information transceiving unit 601 receives network access charge process request information from the information controller 301 when an access is made and terminated, when the network suffer an error, and when access is terminated abnormally. The network access charge process request information is transmitted to the session processing unit 602 and the charge information processing unit 603 based on the charge process request information of the subscriber to control a volume-rate service and session when the subscriber uses the service and a real-time service consumption volume update request is received, and receives a processing result thereof.

The session processing unit 602 processes session information when the network access charge process request information is received from the charge information transceiving unit 601, that is, when the access is made and terminated, when the network suffer an error, and when access is terminated abnormally. It performs session control for real-time session management and forms a session information database in the DB processor 304 based on a session control result. In short, before charging begins, the subscriber's session is registered and the number of session is increased and after the charging is terminated, the subscriber's session is deleted and the number of sessions is decreased. That is, session deletion/registration/update/inquiry functions are provided according to the kind of subscriber charge process request information. Also, the session processing unit 602 performs a function of deleting session information based on the received charge process request information when there is an error in the network access device.

The charge information processing unit 603 collects basic data based on the service consumption volume in the charge information database for charging and statistics when it receives the network access charge process request information from the charge information transceiving unit 601, performs accounting logging in real-time, and generates billing information based on an accounting logging result.

Figure 7:
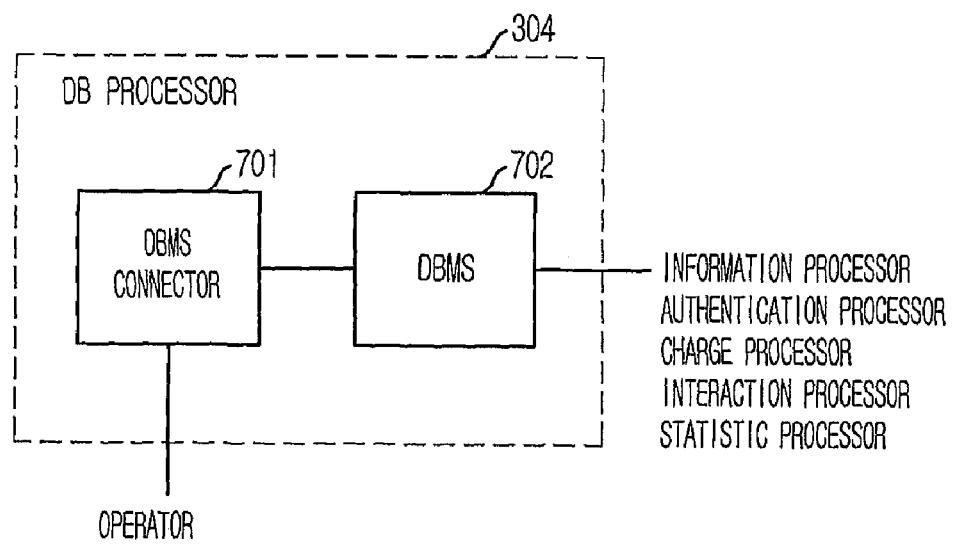
FIG. 7 is a block diagram showing a database (DB) processor of FIG. 3 in accordance with the embodiment of the present invention.

FIG. 7 is a block diagram showing the DB processor of FIG. 3 in accordance with the embodiment of the present invention. As shown in the drawing, the DB processor 304 is formed of a DBMS connecting unit 701 and a DBMS 702.

The DBMS connecting unit 701 provides authentication/charging/session information and statistic and operation functions. It provides various operation-related statistics function with DBMS Interface Function (DBIF), that is, by using an SQL or web functions of the subscriber. The DBMS connecting unit 701 analyzes the meaning of a commands and a sentence and if there is no input error, requests to execute operation corresponding to the command, or if there is an input error, it provides an error message. Also, it provides options of an instant execution or reserved execution for the command execution and, after the execution of the command, the DBMS connecting unit 701 stores the command execution in a history database so that the execution can be searched in a system access history.

The DBMS 702 cooperates with the authentication processor 302 and provides the authentication information database to process the authentication service quickly and accurately, forms the subscriber, authentication and charge database based on the subscriber information received from the Internet, provides the session management database to manage session in real-time in connection with the charge processor 303, collects various measurement information needed to operate the services, e.g., hardware status information, authentication process information from the authentication processor, charge and session information from the charge processor, and subscriber information from the Internet, and stores them in the operation management database.

Particularly, the session management database cooperates with the session information system 15 in real-time and provides the SSO function based on the session value of the network access authentication, which allows the use of additional/application services without additional access and authentication.

Figure 8:
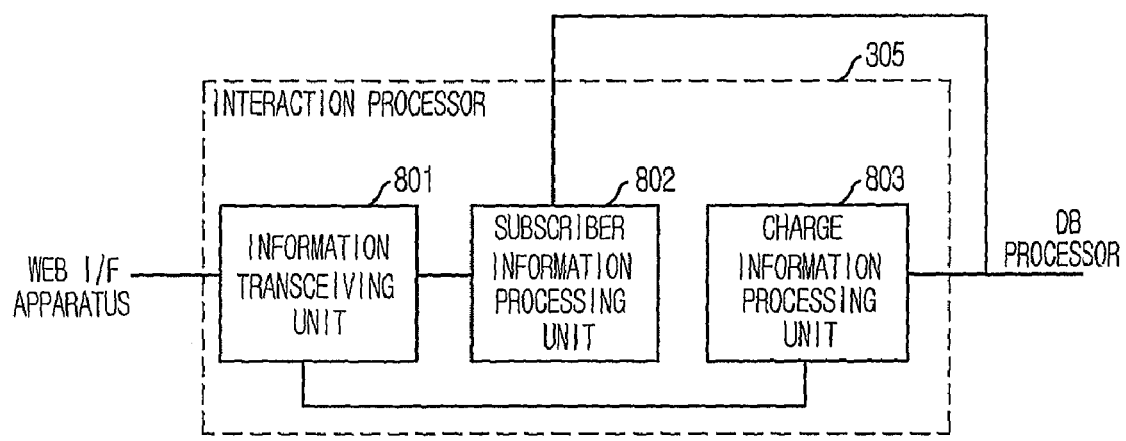
FIG. 8 is a block diagram showing an interaction processor of FIG. 3 in accordance with the embodiment of the present invention.

FIG. 8 is a block diagram showing the interaction processor 305 of FIG. 3 in accordance with the embodiment of the present invention. The interaction processor 305 includes an information transceiving unit 801, a subscription information processing unit 802, and a charge information processing unit 803.

The information transceiving unit 801 receives requests for processing diverse information, i.e., basic information related to the subscription of each user, needed for the subscriber to perform self-provisioning from the Internet, transmits the requests to the subscription information processing unit 802, and receives a processing result thereof. Herein, the requests include ID subscription/termination/modification/inquiry and requests for functions related to additional service subscription.

Also, the information transceiving unit 801 receives diverse requests for charge related information, such as real-time service consumption volume inquiry and integrated charge requests based on an ID hierarchy, transmits the requests to the charge information processing unit 803, and receives a processing result thereof.

The subscription information processing unit 802 performs steps for real-time service subscription and steps for multiple ID subscription. Herein, a user can subscribe the service in diverse forms by diversifying the basic ID hierarchy. For example, IDs of family members or friends can be set up in a hierarchical or equal relationship and charges of the IDs can be integrated and billed to the main subscriber's ID alone. The charge service can be provided in real-time. When additional ID is generated or one of the IDs is changed, a new ID is generated after checking whether there is such ID already used. If there is such ID already generated and used in access, session is controlled not to generate duplicate session. When subscription of an ID is to be terminated, it is checked whether the ID to be terminated really exists and the termination is executed only when the ID actually exists.

IDs can be provided variously according to each service, characteristics, and each user. Subscription of additional services can be provided diversely according to each user. Also, when an ID is generated as a sub-ID of an already ID, i.e., main ID, it is possible to charge the main ID for the new ID. When diverse additional services are subscribed in the new ID other than the access service, an integrated charge function for the additional services is provided.

The charge information processing unit 803 processes charge information requests from the information transceiver 801. It cooperates with the charge information database and session information database in the DB processor 304 and provides charge information with respect to the diverse charge information requests from the subscriber.

Figure 9:
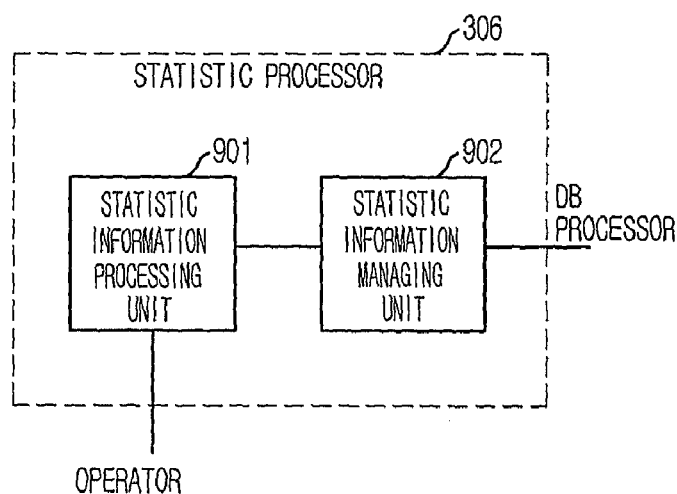
FIG. 9 is a block diagram showing a statistic processor of FIG. 3 in accordance with the embodiment of the present invention.

FIG. 9 is a block diagram showing the statistic processor 306 of FIG. 3 in accordance with the embodiment of the present invention. The statistic processor 306 includes a statistic information processing unit 901 and a statistic information managing unit 902.

The statistic information processing unit 901 receives and processes diverse service statistic information requests from the operator. It extracts necessary information from the charge information database and the operation information database of the DB processor 304 and generates and transmits service statistic information to the operator.

Meanwhile, the statistic information managing unit 902 generates basic data for providing differentiated services for each subscriber through service propensity analysis based on diverse CRM information for each customer ID, and uses the basic data to provide a customized service for each subscriber.

The an embodiment of the present invention, which is described above, can be realized as a program and stored in a computer-readable recording medium, such as CD-ROM, RAM, ROM, floppy disks, hard disks, magneto-optical disks and the like. Since this process can be easily performed by those skilled in the art, further description on it will not be provided herein.

While an embodiments of the present invention has been described, it will be apparent to those skilled in the art that various changes and modifications may be made without departing from the scope of the invention as defined in the following claims.

What is claimed is:

1. An apparatus for processing authentication in a wired or wireless integrated service network, comprising:
   an information controlling means for analyzing information received from a user terminal through a network control platform, transmitting authentication process request information to an authentication processing means and charge process request information to a charge processing means, receiving processing results from the authentication processing means and the charge processing means, and transmitting the processing results to the user terminal through the network control platform;
   an authentication processing means for, when authentication information is received from the information controlling means, acquiring session information and authentication information from a database (DB) processing means, performing authentication process, generating network control information by extracting additional service control information for each subscriber from the DB processing means, and transmitting the generated network control information and the authentication result to the information controlling means;
   a charge processing means for, when the charge process request information is received from the information controlling means, acquiring charge information and session information for the subscriber from the DB processing means and performing charge processing;
   the DB processing means for managing authentication information, charge information, subscriber information, session information and operation management information in a form of a database; and
   an interaction processing means for receiving an access or service subscription request or a charge inquiry request from the subscriber through the Internet performing subscription or charge processing, transmitting access or charge processing results to the subscriber through the Internet,
   wherein, when the authentication process request information is wireless authentication process request information, the information controlling means checks whether the number of simultaneous sessions of the subscriber who requested authentication currently is in an allowable range in the DB processing means before information controlling means transmits the wireless authentication process request information to the authentication processing means and, if the session number is within the allowable range, the information controlling means transmits the authentication information to the authentication processing means; or if the session number exceeds the allowable range, the information controlling means transmits an authentication failure message to the user terminal through the network control platform,
   wherein the authentication processing means includes:
   an authentication information transceiving unit for receiving the authentication process request information from the information controlling means, identifying whether the authentication process request information is a wired authentication process request information or a wireless authentication process request information, transmitting a wired authentication process request information to a wired authentication processing unit or a wireless authentication process request information to a wireless authentication processing unit, receiving and transmitting an authentication result from the wired authentication processing unit or the wireless authentication processing unit along with additional service control information to the information controlling means;
   the wired authentication processing unit for checking subscriber information in the DB processing means, checking a mobility value for providing the service to a wired service subscriber in a wireless Local Area Network (LAN) area and performing authentication to thereby produce an authentication result, extracting the additional service control information in the DB processing means, and transmitting the additional service control information to the authentication information transceiving means along with the authentication result;
   the wireless authentication processing unit for processing authentication within the allowable range of session number with respect to the wireless authentication process request information transmitted from the authentication information transceiving unit to thereby produce a wireless authentication result, and transmitting the wireless authentication result to the authentication information transceiving unit; and
   a first session processing unit for performing a different session processing according to each wired or wireless authentication service, and cooperating with the wired and wireless authentication processing units to process authentication within the allowable range of session number.

2. The apparatus as recited in claim 1, wherein the charge processing means includes:
   a charge information transceiving unit for receiving the charge process request information from the information controlling means, transmitting the charge process request information to a second session processing unit and a charge information processing unit to provide a volume-rate service, where a subscriber pay as much as he consumes a service, and control sessions based on the received charge process request information of the subscriber, receiving and transmitting a processing result from the second session processing unit and the charge information processing unit to the information controlling means;
   the second session processing unit for receiving the charge process request information from the charge information transceiving unit, processing session information according to the kind of the received charge process request information, and forming the session information database in the DB processing means based on the processed session information; and
   the charge information processing unit for receiving the charge process request information transmitted from the charge information transceiving means, forming the charge information database with basic data based on the service consumption volume for charge or statistics, performing accounting logging on charge information of the charge information database in real-time, and generating a billing information.

3. The apparatus as recited in claim 2, wherein the session information of the DB processing means is managed in connection with a session information system in real-time.

4. The apparatus as recited in claim 3, wherein the interaction processing means includes:
   an information transceiving unit for receiving subscription related information of each subscriber from a subscriber through the Internet, transmitting the subscription related information to a subscription information processing means, and receiving and transmitting a subscription information processing result form the subscription information processing means to the subscriber; or receiving a charge information request from the user through the Internet, transmitting the charge information request to the charge information processing means, and receiving and transmitting a charge processing result from the charge information processing means to the subscriber;

a subscription information processing unit for processing subscription in real-time in diverse subscriber identification (ID) system based on the subscription related information transmitted from the information transceiving unit; and a charge information processing means for, when the charge information request is received from the information transceiving unit, performing charge processing based on the charge information and the session information which are stored in the DB processing means to thereby produce a charge processing result, and transmitting the charge processing result to the information transceiving unit.

5. The apparatus as recited in claim 4, wherein the subscription information processing means further providing a function of generating additional ID for family members or friends in a hierarchical or equal relationship and integrating charges of the additional IDs in the ID of one subscriber upon receipt of a user request.

* * * * *